F. O. STREED.
DEVICE FOR CONNECTING MARBLE SLABS.
APPLICATION FILED JUNE 16, 1906.
924,703.
Patented June 15, 1909.
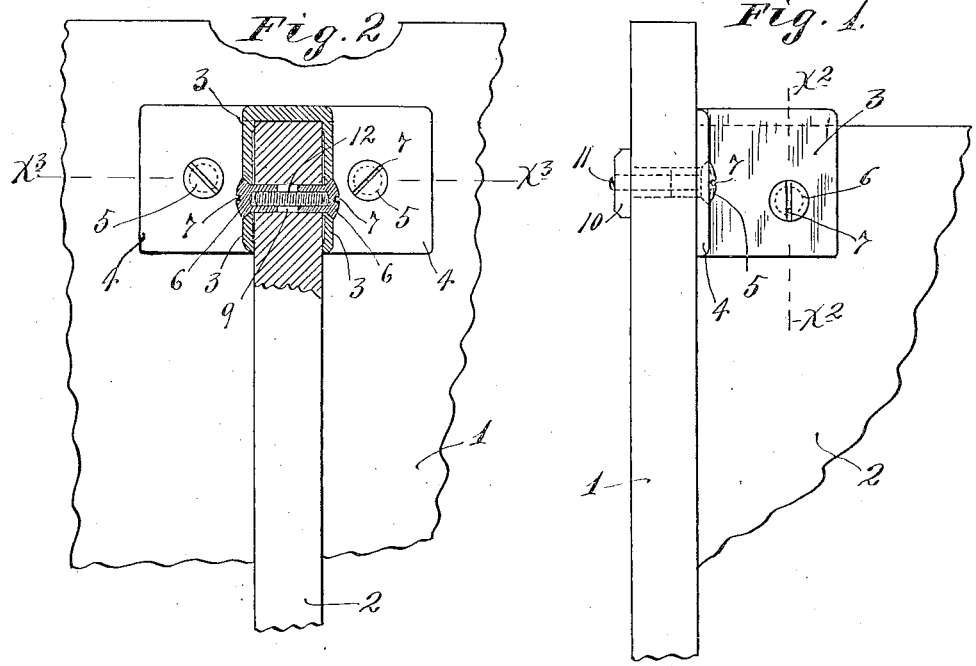
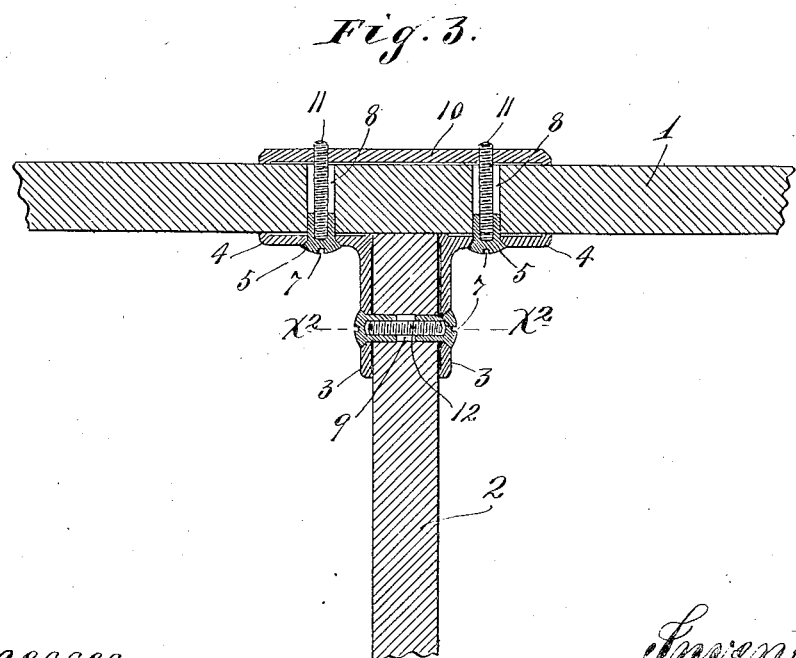
Witnesses.
A. H. Opsahl.
E. W. Jeppesen.
Inventor.
Frank. O. Streed.
By his Attorneys
Williamson & Merchant

UNITED STATES PATENT OFFICE.

FRANK O. STREED, OF MINNEAPOLIS, MINNESOTA.

DEVICE FOR CONNECTING MARBLE SLABS.

No. 924,703.  Specification of Letters Patent.  Patented June 15, 1909.

Application filed June 16, 1906. Serial No. 322,114.

*To all whom it may concern:*

Be it known that I, FRANK O. STREED, a citizen of the United States, residing at Minneapolis, in the county of Hennepin and State of Minnesota, have invented certain new and useful Improvements in Devices for Connecting Marble Slabs; and I do hereby declare the following to be a full, clear, and exact description of the invention, such as will enable others skilled in the art to which it appertains to make and use the same.

My invention has for its especial object to provide an improved device for connecting marble slabs, where the one slab extends at right angles or obliquely to the other, and to this end it consists of the novel devices and combinations of devices hereinafter described and defined in the claim.

In the accompanying drawings which illustrate the invention, like characters indicate like parts throughout the several views.

Referring to the drawings: Figure 1 is a view in side elevation showing two marble slabs connected by my improved device, some parts being broken away. Fig. 2 is a front elevation of the parts shown in Fig. 1, some parts being sectioned on the line $x^2$ $x^2$ of Figs. 1 and 3, some parts being broken away, and Fig. 3 is a horizontal section taken approximately on the line $x^3$ $x^3$ of Fig. 2, some parts being broken away.

The numeral 1 indicates what may be designated as the wall slab, and 2 what may be designated a stall or partition slab. The slab 1 may be assumed to be secured at its back against a wall, by the usual or any suitable means.

Referring to the parts of the improved coupling, the numeral 3 indicates an inverted approximately U-shaped saddle bracket, the depending sides of which are provided at their rear edges with oppositely extended flanges 4. This saddle bracket 3 is adapted to be slipped down and over the upper edge of the rear portion of the slab 2, with its flanges 4 bearing against the adjacent face of the slab 1.

Cap nuts 5 work loosely in seats formed in the flanges 4, and similar cap nuts 6 work loosely through seats in the depending side webs of the saddle bracket 3. These cap nuts 5 and 6 are provided with heads that are countersunk into the flanges or webs with which they engage, and are provided with slightly rounded outer surfaces and with grooves 7 that adapt them to be turned by means of a screw-driver.

The slab 1 is provided with perforations 8, in which the sleeve portions of the cap nuts 5 work loosely; and likewise the slab 2 is formed with perforations 9, in which the sleeve portions of the cap nut 6 work loosely. At the back of the slab 1 is a metal strap or clamping bar 10 that overlaps the inner extremities of the perforations 8. Small threaded rods or studs 11 are screwed into the sleeve portions of the cap nuts 5, and fit the threaded seats in the clamping bar 10. Similar threaded rods or studs 12 are screwed into the sleeve portions of the axially alined cap nuts 6. As is evident, when the cap nuts 5 and 6 are tightened up, the bracket will be firmly clamped to the two slabs 1 and 2, and the said two slabs will be firmly united or coupled together. The smooth counter heads of the cap nuts leave the outer surface of the bracket smooth and practically free from projections. The screw rods or studs 11 and 12 are entirely relieved from shearing or lateral strains, such strains being taken entirely by the sleeve portions of the cap nuts 5 and 6. Furthermore, a large range of adjustability is afforded, since the said screw rods 11 are adjustable both in the cap nuts 5 and in the clamping bar 10; while the said screw rods 12 are each adjustable in the two alined cap nuts.

The device described, while simple, convenient and efficient for the purposes had in view, is also of small cost, and when applied has a very neat and finished appearance. The device above described may be used for connecting various kinds of slabs or plates other than marble slabs, and might, for instance, be used to connect panes of plate glass.

I claim as my invention:

The combination with a U-shaped saddle bracket 3 having projecting flanges 4, of a clamping bar 10, cap nuts 5, heads which are counter-sunk into said flanges 4, rods 11 threaded at both ends, and having threaded engagement with said bar 10 and with the sleeve portions of said cap nut, axially alined cap nuts 6 having their heads countersunk into the side webs of said bracket 3, and a screw rod 12 having threaded engagement with the sleeve portions of said cap nut 6, substantially as described.

In testimony whereof I affix my signature in presence of two witnesses.

FRANK O. STREED.

Witnesses:
 MALIE HOEL,
 F. D. MERCHANT.